(12) United States Patent
Hsu

(10) Patent No.: US 12,053,068 B2
(45) Date of Patent: Aug. 6, 2024

(54) SUPPORT BOARD STRUCTURE

(71) Applicant: POWERGENE TECHNOLOGY CO., LTD., TAIWAN BRANCH, New Taipei (TW)

(72) Inventor: Hui-Te Hsu, New Taipei (TW)

(73) Assignee: POWERGENE TECHNOLOGY CO., LTD., TAIWAN BRANCH, New Taipei (TW)

( * ) Notice: Subject to any disclaimer, the term of this patent is extended or adjusted under 35 U.S.C. 154(b) by 349 days.

(21) Appl. No.: 17/732,392

(22) Filed: Apr. 28, 2022

(65) Prior Publication Data
US 2023/0346094 A1 Nov. 2, 2023

(51) Int. Cl.
| | |
|---|---|
| F16M 11/00 | (2006.01) |
| A45C 11/00 | (2006.01) |
| A47B 23/04 | (2006.01) |
| F16M 13/00 | (2006.01) |

(52) U.S. Cl.
CPC ............ *A45C 11/00* (2013.01); *A47B 23/044* (2013.01); *F16M 13/005* (2013.01); *A45C 2011/002* (2013.01); *A45C 2011/003* (2013.01); *A45C 2200/15* (2013.01)

(58) Field of Classification Search
None
See application file for complete search history.

(56) References Cited

U.S. PATENT DOCUMENTS

| | | | | |
|---|---|---|---|---|
| 7,758,009 | B1* | 7/2010 | Chang | A47B 23/044 |
| | | | | 248/456 |
| 10,606,314 | B1* | 3/2020 | Takano | F16M 11/2021 |
| 2019/0018449 | A1* | 1/2019 | Fenton | G06F 1/166 |
| 2020/0178662 | A1* | 6/2020 | Takano | A47B 23/044 |
| 2020/0208773 | A1* | 7/2020 | Lin | H04B 1/3888 |
| 2021/0014348 | A1* | 1/2021 | Lin | G06F 1/166 |
| 2021/0310600 | A1* | 10/2021 | Sawaqedy | F16M 11/38 |
| 2022/0192367 | A1* | 6/2022 | Kim | G06F 1/203 |

* cited by examiner

*Primary Examiner* — Steven M Marsh
(74) *Attorney, Agent, or Firm* — Chun-Ming Shih; HDLS IPR SERVICES

(57) ABSTRACT

A support board structure includes a base plate, a folding plate, and an elastic binding belt. The base plate has a top edge, a bottom edge, and a backside therebetween. The folding plate includes an abutting portion pivotally connected to the bottom edge, a connecting portion and a supporting portion pivotally connected between the abutting portion and the connecting portion. The supporting portion is formed with a strip-shaped hole. An end of the elastic binding belt is fixed to the base plate, and another end thereof is fixed to the base plate and passing the connecting portion. The folding plate flatly abuts against the backside when collapsed, and the connecting portion is reversely folded to flatly abut against the backside to form a three-dimensional structure and define an elevation angle between the abutting portion and the base plate when expanded.

10 Claims, 8 Drawing Sheets

SUPPORT BOARD STRUCTURE

BACKGROUND

Technical Field

The disclosure relates to a support board structure, particularly to a support board structure for supporting an electronic device or being hung on a user's hand.

RELATED ART

With the development of electronic technologies, various kinds of electronic devices, such as smartphones, PDAs, eBook readers, laptops, MP3 players, MP4 players, tablet computers or digital cameras, continuously appear in the markets. When an electronic device is used by holding with hands for a long time, it is easy to cause fatigue in neck and hands. When an electronic device is placed on a table for use, it must be forward tilted, this also causes fatigue in back and neck. Further, a light source such as a lamp irradiating an electronic device will cause screen reflections to interfere with reading and operating. Thus, always placing an electronic device on a table with a tilt angle is an easy way for reading and operating.

However, products for supporting an electronic device are of protective cases. Their primary function is to protect and cover a screen and a housing of an electronic device, so an electronic device cannot be effectively positioned when it is aslant placed. Also, an electronic device is easy to slide by its own weight or an improper touch, or a protective case occupies too much space to cause inconvenience and distress of being not easy to store and carry.

In view of this, the inventors have devoted themselves to the above-mentioned related art, researched intensively and cooperated with the application of science to try to solve the above-mentioned problems. Finally, the invention which is reasonable and effective to overcome the above drawbacks is provided.

SUMMARY

An object of the disclosure is to provide a support board structure for supporting an electronic device or being hung on a user's hand.

To accomplish the above object, the disclosure provides a support board structure, which includes a base plate, a folding plate, and an elastic binding belt. The base plate has a backside, a top edge, and a bottom edge. The top edge and the bottom edge are opposite to each other. The backside is between the top edge and the bottom edge. The folding plate includes an abutting portion, a supporting portion, and a connecting portion. The abutting portion is pivotally connected to the bottom edge. The supporting portion is pivotally connected between the abutting portion and the connecting portion. The supporting portion is formed with a strip-shaped hole. The connecting portion is formed with a through hole. An end of the elastic binding belt is fixed to the base plate, and another end thereof is fixed to the base plate and passing the through hole. Part of the elastic binding belt is exposed in the strip-shaped hole. The folding plate flatly abuts against the backside when collapsed, and the connecting portion is reversely folded to flatly abut against the backside to form a three-dimensional structure among the abutting portion, the supporting portion and the base plate and define an elevation angle between the abutting portion and the base plate when expanded.

The disclosure further has the following functions. A width of the connecting portion is less than a width of the supporting portion, so the connecting portion may be formed by upward folding the supporting portion after cutting to form the strip-shaped hole to save material and costs. A width of the connecting portion is equal to a width of the supporting portion, so better effects of support and attachment may be obtained. Part of the elastic binding belt is exposed in the strip-shaped hole, so the elastic binding belt may be elastically pulled out from the strip-shaped hole to be worn on user's hand. The base plate and the folding plate are secured by the magnetic members, an adhesive tape, a hook-and-loop fastener, or an engagement manner, so the folding plate may be fixed on the base plate in different modes. The cover layer may prevent the base plate and the folding plate from causing long-term wear, and may possess buffer and shock absorption effect. Also, each bending portion may allow two components which are correspondingly connected to be pivotally folded.

DETAILED DESCRIPTION

Figure 1:
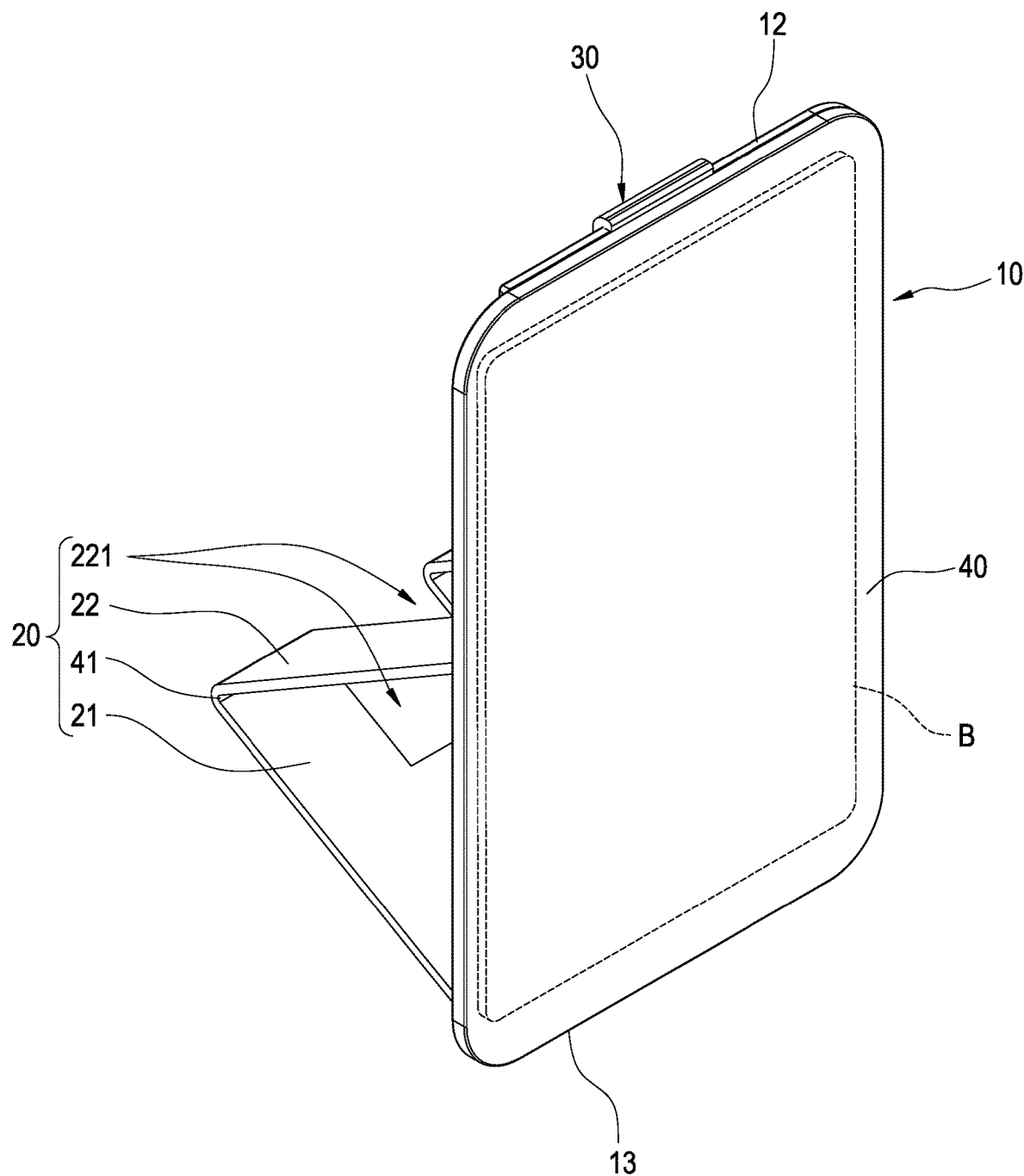
FIG. 1 is a perspective view of the disclosure which is expanded.

The technical contents of this disclosure will become apparent with the detailed description of embodiments accompanied with the illustration of related drawings as follows.

It is intended that the embodiments and drawings disclosed herein are to be considered illustrative rather than restrictive.

The disclosure provides a support board structure for supporting an electronic device A or being directly installed on an electronic device A or a protective case of an electronic device A. The electronic device A may be a smartphone, a tablet computer, a portable computer, or other computer peripheral products (3C). According to the electronic device A with different sizes, the support board structure of the disclosure may be correspondingly adjusted to support a proper electronic device A. Please refer to FIGS. 1-5. The support board structure includes a base plate 10, a folding plate 20 and an elastic binding belt 30.

The base plate 10 is of a substantially rectangular shape and has a backside 11, a top edge 12 and a bottom edge 13. The top edge 12 and the bottom edge 13 are opposite to each other. The backside 11 is between the top edge 12 and the bottom edge 13. The folding plate 20 includes an abutting portion 21, a supporting portion 22 and a connecting portion 23, which are arranged longitudinally and sequentially away from the bottom edge 13. The abutting portion 21 is pivotally connected to the bottom edge 13. The supporting portion 22 is pivotally connected between the abutting portion 21 and the connecting portion 23 to make the abutting portion 21 be able to rotate relative to the supporting portion 22. The supporting portion 22 is formed with a strip-shaped hole 221. The connecting portion 23 is formed with a through hole 231. The strip-shaped hole 221 is defined along the arrangement direction of the abutting portion 21, the supporting portion 22 and the connecting portion 23, that is, the strip-shaped hole 221 is parallel to the extending direction of the folding plate 20.

Figure 2:
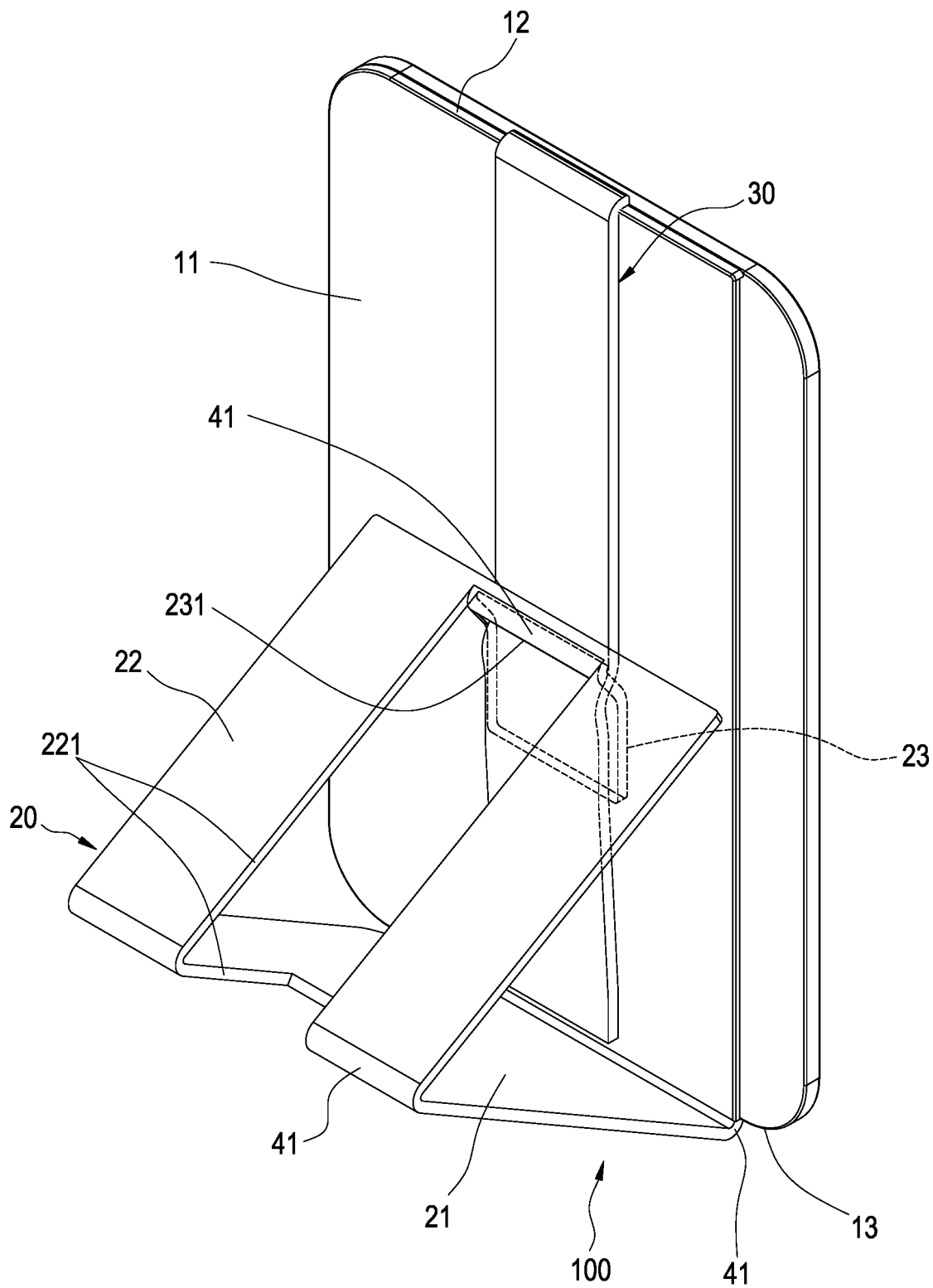
FIG. 2 is another perspective view of the disclosure which is expanded.
Figure 4:
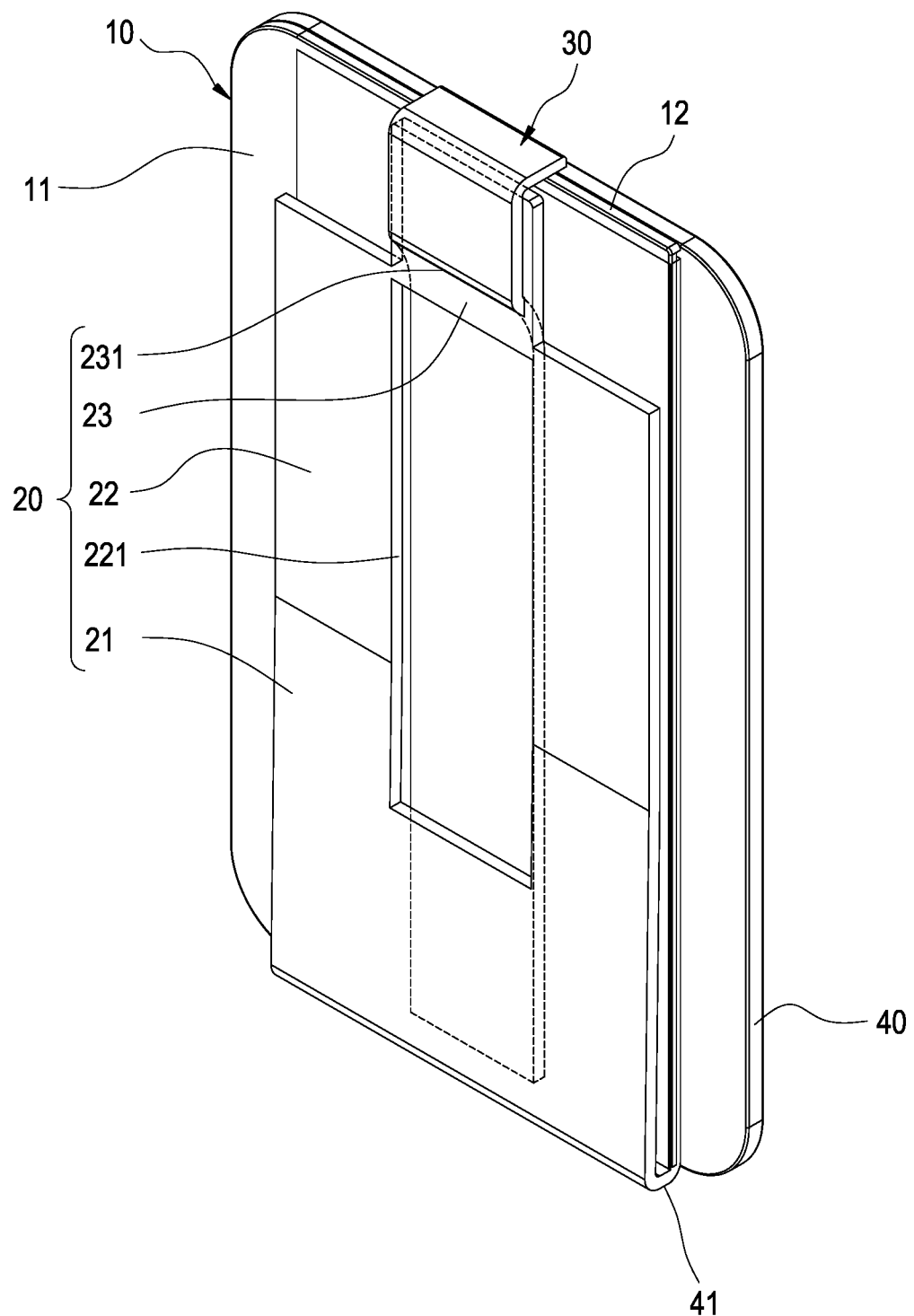
FIG. 4 is a perspective view of the disclosure which is collapsed.
Figure 6:
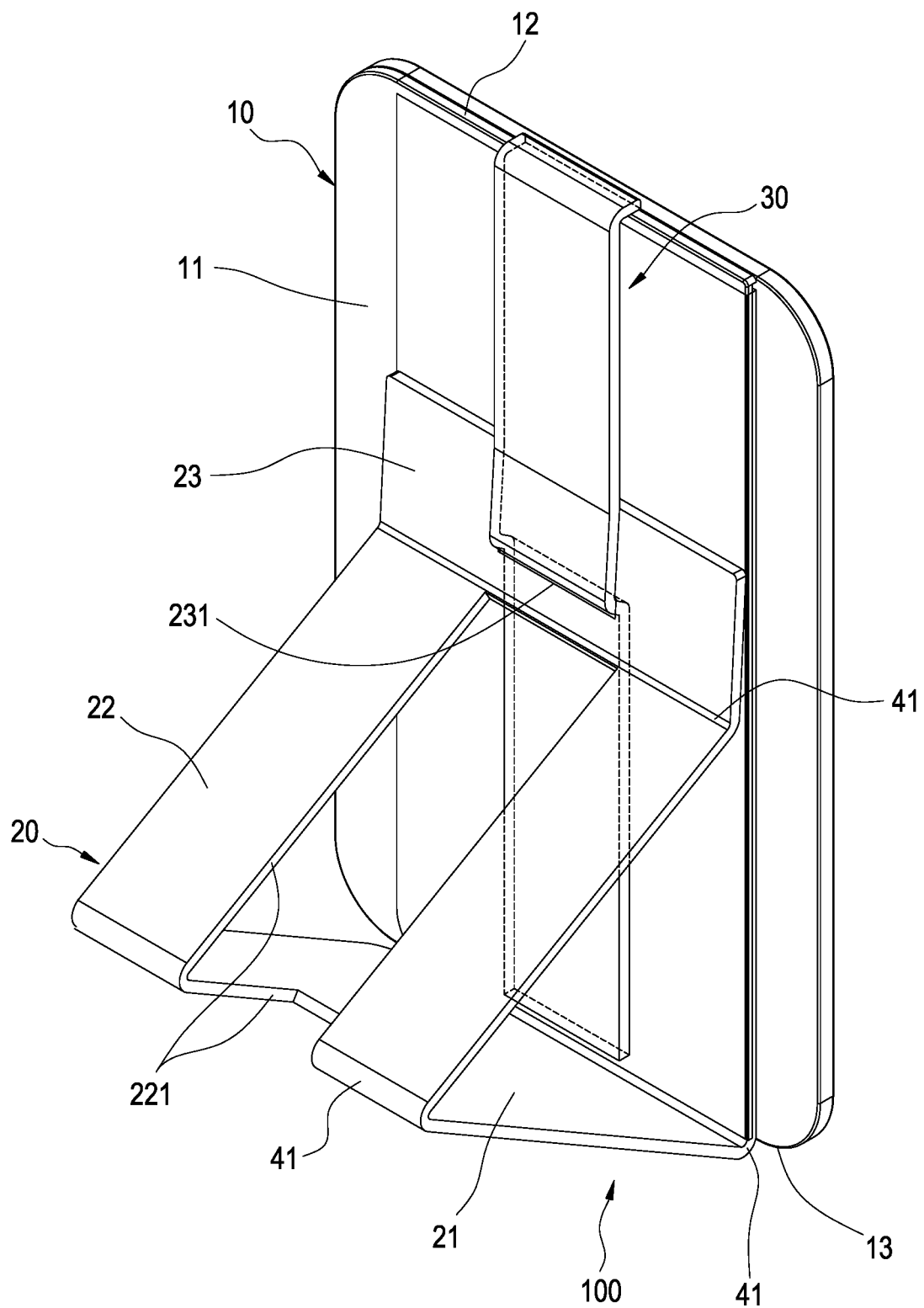
FIG. 6 is a perspective view of another embodiment of the disclosure which is expanded.

Please refer to FIGS. 2 and 4. In the embodiment, a width of the connecting portion 23 is less than a width of the supporting portion 22, so that the connecting portion 23 may be formed by upward folding the supporting portion 22 after cutting to form the strip-shaped hole 221 to save material costs and reduce manufacturing costs, but not limited to this. Please refer to FIG. 6, which shows another embodiment of the disclosure. The primary difference is the shape of the connecting portion 23. In detail, a width of the connecting portion 23 is equal to a width of the supporting portion 22 to provide better effects of support and attachment. Thus, a designer may adopt different types of connecting portion 23 according to demands.

An end of the elastic binding belt 30 is fixed to the base plate 10, and the other end of the elastic binding belt 30 is fixed to the base plate 10 and passing the through hole 231. Therefore, the connecting portion 23 may upward or downward move along the elastic binding belt 30 when the folding plate 20 is folded and pivoted. Part of the elastic binding belt 30 is exposed in the strip-shaped hole 221 to make the elastic binding belt 30 be elastically pulled from the strip-shaped hole 221 to the outside of the folding plate 20. In some embodiments, the strip-shaped hole 221 is further extended from the supporting portion 22 to the abutting portion 21 to elongate a length of the strip-shaped hole 221. Thus, the exposed area of the elastic binding belt 30 in the strip-shaped hole 221 is increased to facilitate a user pulling out the elastic binding belt 30 for use.

In the embodiment, a magnetic member B is embedded in the base plate 10, and another magnetic member (not shown) is respectively embedded in the abutting portion 21, the supporting portion 22 and the connecting portion 23 of the folding plate 20. In some embodiments, the magnetic member B of the base plate 10 is disposed in the base plate 10 corresponding to the size of the backside 11, but not limited to this. For example, the magnetic member B of the base plate 10 may also be splice of multiple ones or disposed correspondingly to a partial area of the backside 11. Each magnetic member B may be a magnet set with opposite polarity or one magnet and one iron or alloy containing iron, but not limited to these, as long as they can generate a magnetic force to attract. Also, the disclosure is not limited to use magnetic attraction to secure, for example, the backside 11 of the base plate 10 and the abutting portion 21, the supporting portion 22 and the connecting portion 23 of the folding plate 20 may also be secured by an adhesive tape, a hook-and-loop fastener or an engagement manner, the following description only use magnetic attraction as an example.

Figure 5:
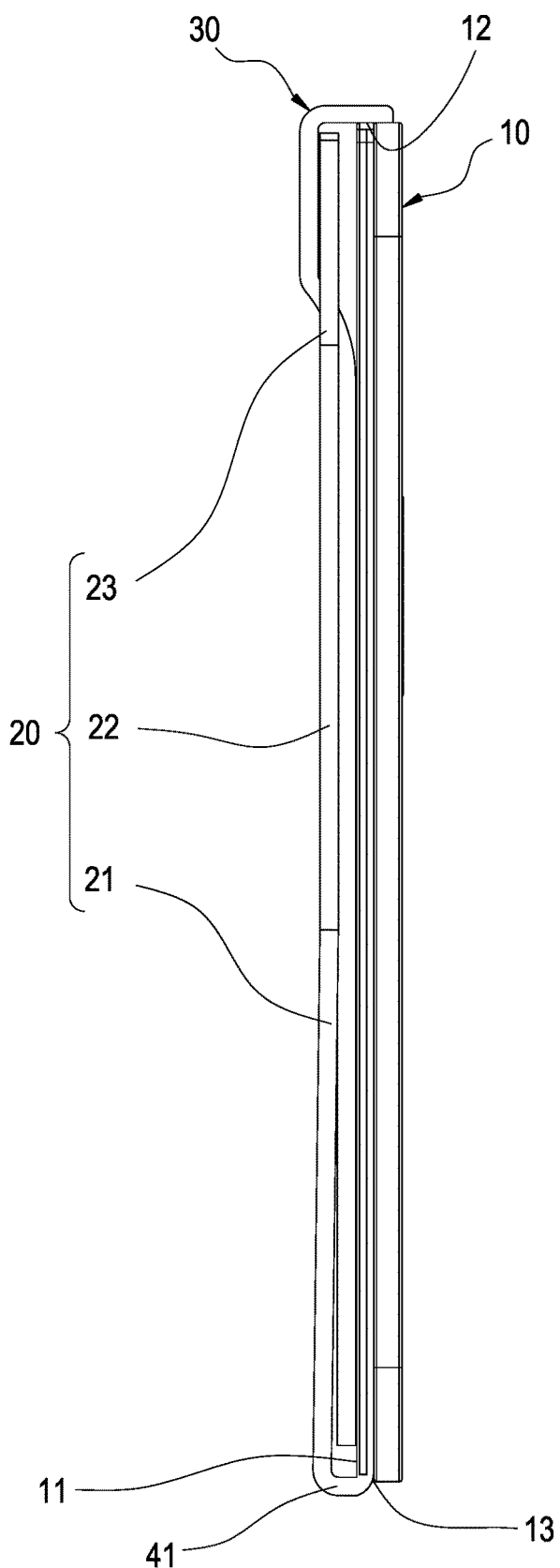
FIG. 5 is a side view of the disclosure which is collapsed.

Please refer to FIGS. 4-5. The folding plate 20 flatly abuts against the backside 11 when collapsed, and the two are secured by the magnetic attraction between the base plate 10 and the folding plate 20. At the same time, the support board structure of the disclosure occupies small space to facilitate carrying and storing.

Figure 3:
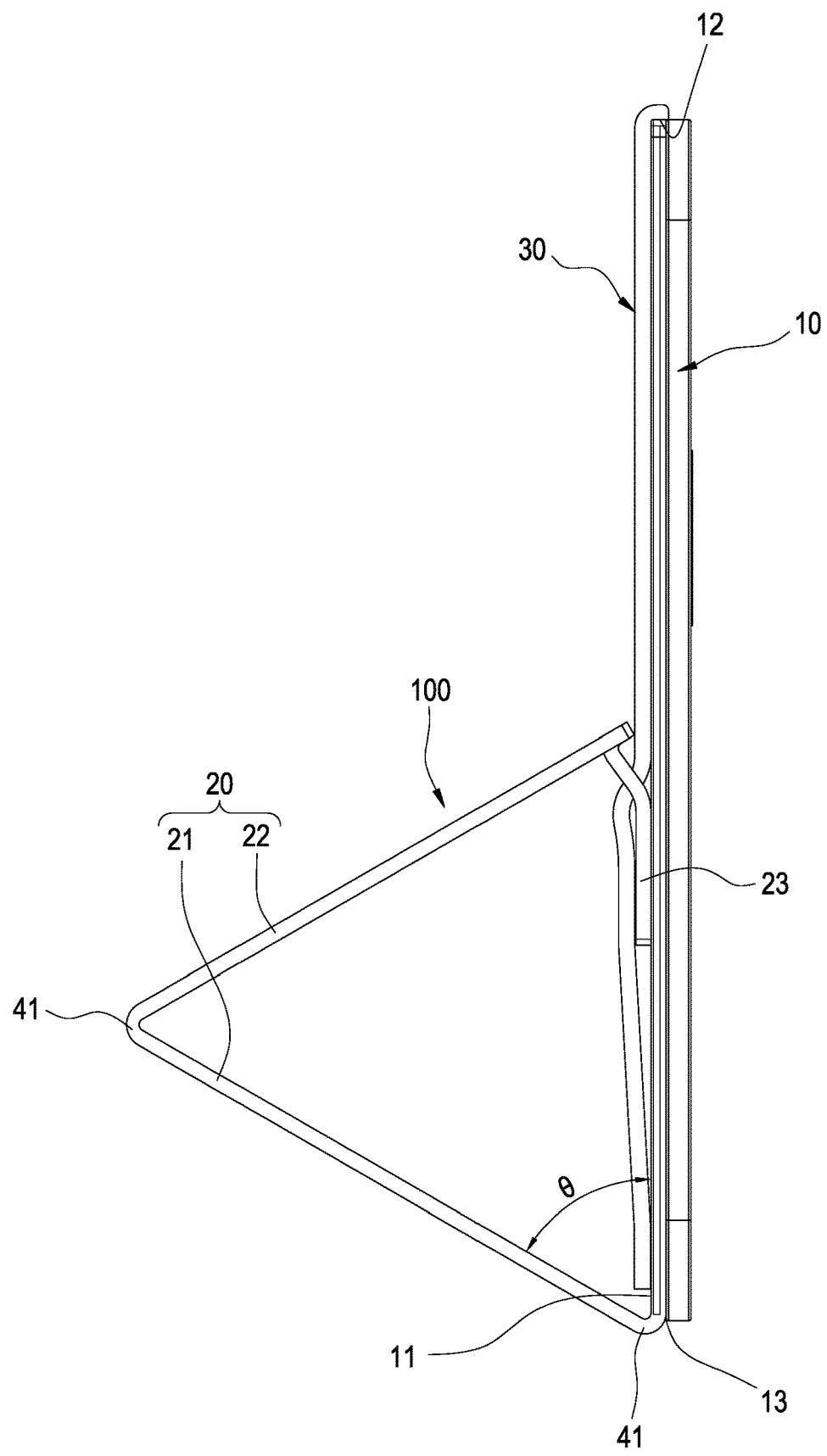
FIG. 3 is a side view of the disclosure which is expanded.

Please refer to FIGS. 1-3. The connecting portion 23 is reversely folded to upward move to a required position through the through hole 231 of the connecting portion 23 and along the elastic binding belt 30 to be flatly attached on the backside 11 of the base plate 10 by magnetic attraction to make the abutting portion 21, the supporting portion 22 and the base plate 10 form a three-dimensional structure 100 and define an elevation angle θ between the abutting portion 21 and the base plate 10 to aslant support the electronic device A when expanded. When the connecting portion 23 moves toward a direction away from the abutting portion 21, the elevation angle θ is gradually decreasing. When the connecting portion 23 moves toward a direction adjacent to the abutting portion 21, the elevation angle θ is gradually increasing. Thus, the disclosure does not limit the degree of the elevation angle θ, a user may adjust the elevation angle θ according to his or her requirement to make the user convenient to watch the electronic device A.

Moreover, the support board structure of the disclosure further includes a cover layer 40. The cover layer 40 covers the outer surfaces of the base plate 10 and the folding plate 20. A bending portion 41 is respectively formed between the base plate 10 and the abutting portion 21, between the abutting portion 21 and the supporting portion 22 and between the supporting portion 22 and the connecting portion 23. In the embodiment, the cover layer 40 may be a material of a non-woven fabric, a rubber, an artificial PU, a plastic or other proper materials, but not limited to these. The cover layer 40 may prevent the base plate 10 and the folding plate 20 from being exposed of causing long-term wear, and may possess buffer and shock absorption effect. Also, each bending portion 41 may allow two components which are correspondingly connected to be pivotally folded.

Figure 7:
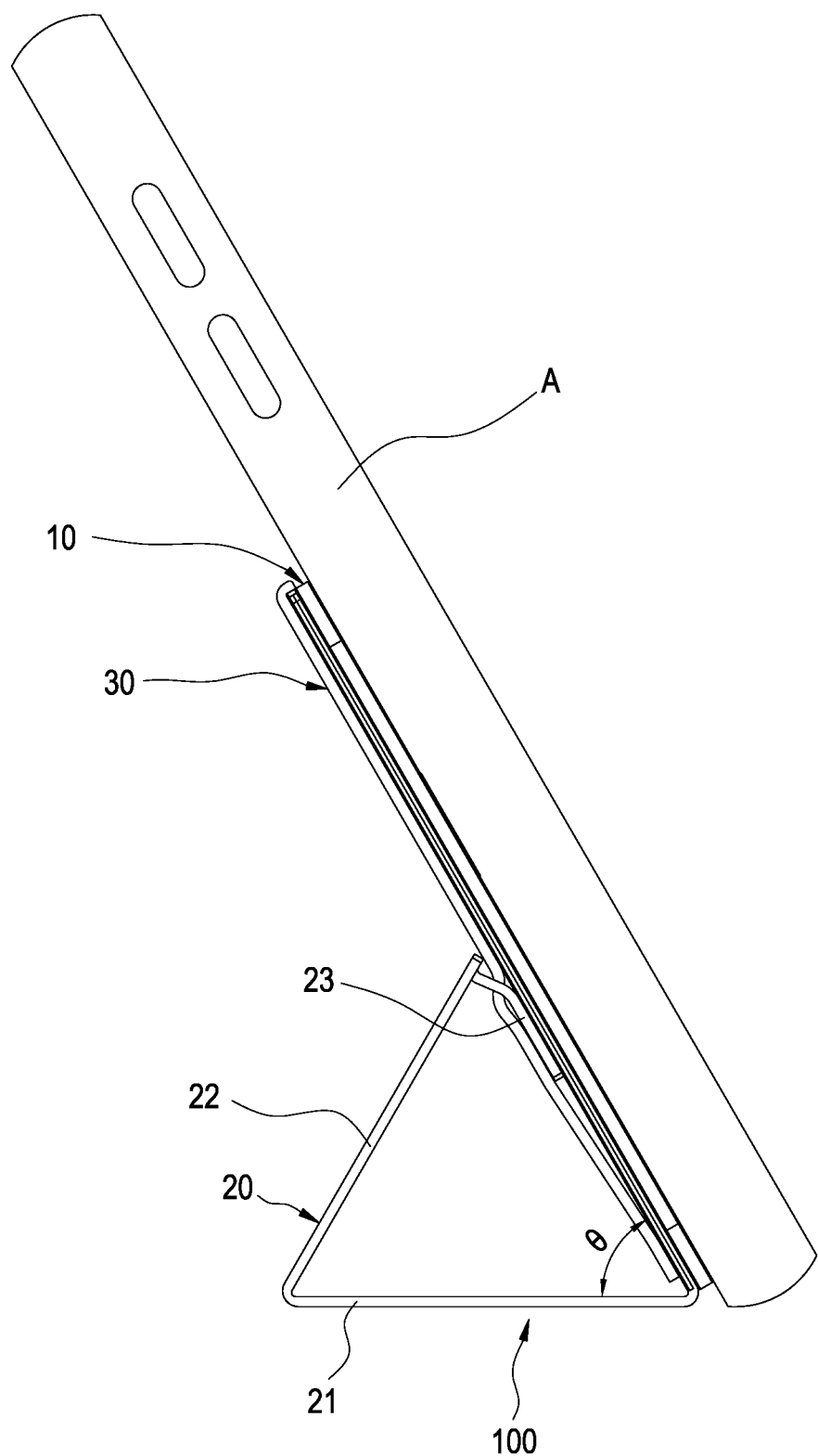
FIG. 7 is a schematic view of the disclosure in use.
Figure 8:
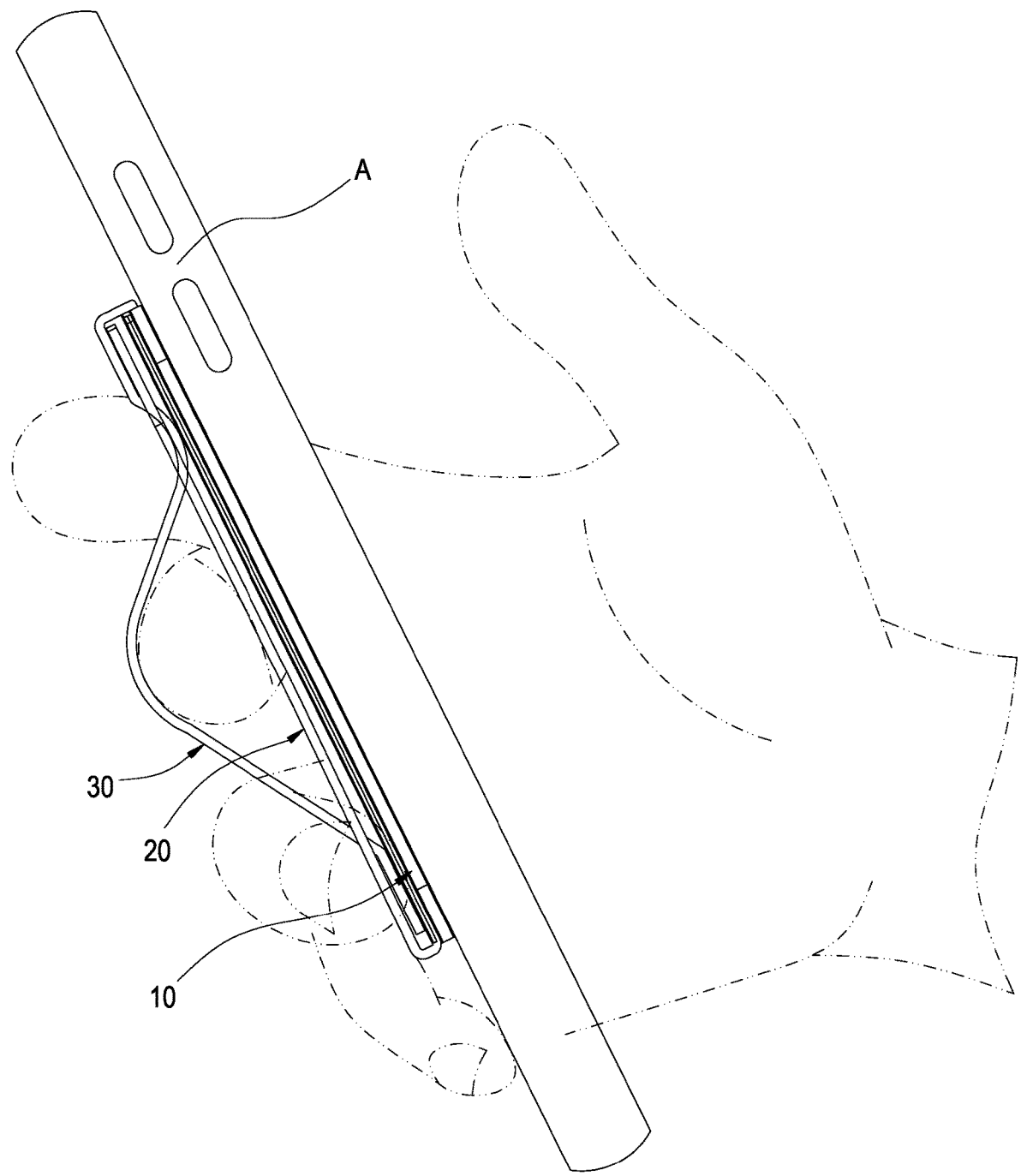
FIG. 8 is another schematic view of the disclosure in use.

Please refer to FIGS. 7-8, which are schematic views of the disclosure in different scenarios, where the electronic device A is exemplarily a smartphone.

Please refer to FIG. 7. When a user expands the folding plate 20 in association with the base plate 10 to form the three-dimensional structure 100, the electronic device A may lean on the base plate 10 and be supported by the three-dimensional structure 100, and the user may adjust the elevation angle θ according to demand to adjust to the most comfortable angle of watching.

Please refer to FIG. 8. When the support board structure of the disclosure is collapsed, a user may pull out the elastic binding belt 30 from the strip-shaped hole 221 and then has his or her finger pass through a gap between the elastic binding belt 30 and the folding plate 20 to make the support board structure be hung on the user's hand without using fingers to grip the electronic device A.

While this disclosure has been described by means of specific embodiments, numerous modifications and variations could be made thereto by those skilled in the art without departing from the scope and spirit of this disclosure set forth in the claims.

What is claimed is:

1. A support board structure comprising:
   a base plate, comprising a backside, a top edge and a bottom edge opposite to each other, and the backside located between the top edge and the bottom edge;
   a folding plate, comprising an abutting portion, a supporting portion and a connecting portion, the abutting portion pivotally connected to the bottom edge, the supporting portion pivotally connected between the abutting portion and the connecting portion, a strip-shaped hole defined on the supporting portion, and a through hole defined on the connecting portion; and
   an elastic binding belt, an end thereof fixed to the base plate, another end thereof passing the through hole and fixed to the base plate, and part of the elastic binding belt exposed in the strip-shaped hole;

wherein when the folding plate is collapsed, the folding plate flatly abuts against the backside, when the folding plate is expanded, the connecting portion is reversely folded to flatly abut against the backside to form a three-dimensional structure among the abutting portion, the supporting portion and the base plate and define an elevation angle between the abutting portion and the base plate.

2. The support board structure of claim 1, wherein when the connecting portion moves toward a direction away from the abutting portion, the elevation angle is gradually decreasing, when the connecting portion moves toward a direction adjacent to the abutting portion, the elevation angle is gradually increasing.

3. The support board structure of claim 1, wherein the abutting portion, the supporting portion and the connecting portion are arranged longitudinally, and the strip-shaped hole is defined along an arrangement direction of the abutting portion, the supporting portion, and the connecting portion.

4. The support board structure of claim 1, wherein the strip-shaped hole is further extended to the abutting portion.

5. The support board structure of claim 1, wherein a width of the connecting portion is less than a width of the supporting portion.

6. The support board structure of claim 1, wherein a width of the connecting portion is equal to a width of the supporting portion.

7. The support board structure of claim 1, further comprising: a cover layer covering outer surfaces of the base plate and the folding plate, and a bending portion respectively disposed between the base plate and the abutting portion, between the abutting portion and the supporting portion and between the supporting portion and the connecting portion.

8. The support board structure of claim 7, wherein the cover layer comprises a material of a non-woven fabric, a rubber, an artificial PU, or a plastic.

9. The support board structure of claim 1, wherein a magnetic member is embedded in the base plate, and another magnetic member is respectively embedded in the abutting portion, the supporting portion, and the connecting portion.

10. The support board structure of claim 1, wherein the backside, the abutting portion, the supporting portion, and the connecting portion are connected by an adhesive tape, a hook-and-loop fastener, or an engagement manner.

* * * * *